United States Patent [19]
Johnson et al.

[11] 3,900,201
[45] Aug. 19, 1975

[54] SEMI-MOUNTED CARRIER

[75] Inventors: Otto E. Johnson, Hinsdale; Roland J. Frase, Roselle; Ernest G. Treptow, Westmont, all of Ill.

[73] Assignee: International Harvester Company, Chicago, Ill.

[22] Filed: Nov. 11, 1974

[21] Appl. No.: 522,670

[52] U.S. Cl............... 280/5 H; 280/481; 280/150 F
[51] Int. Cl.² ......................................... B60P 3/22
[58] Field of Search ........ 280/5 R, 5 H, 481, 150 F, 280/5 A

[56] References Cited
UNITED STATES PATENTS
| | | | |
|---|---|---|---|
| 2,424,468 | 7/1947 | Keathley | 280/5 H |
| 3,003,775 | 10/1961 | Ackley | 28/5 R |
| 3,488,061 | 1/1970 | Hansen | 280/5 A |

FOREIGN PATENTS OR APPLICATIONS
| | | | |
|---|---|---|---|
| 747,853 | 4/1956 | United Kingdom | 280/5 H |

*Primary Examiner*—Robert R. Song
*Attorney, Agent, or Firm*—Neal C. Johnson; Floyd B. Harman

[57] ABSTRACT

A wheeled carrier for liquid fertilizer and chemical tanks adapted for coupling to a tractor used in conjunction with agricultural spraying operations. The carrier includes a generally U-shaped frame of substantial size adapted to encompass the forward portion of an agricultural type tractor to which the forward portion of the frame is connected in load-supporting relation. The legs of the U-shaped frame are supported on respective caster wheels and are adapted to support respective fluid-containing tanks. The frame is vertically hinged at the front and is secured to the front of the tractor at the hinge such that the legs are movable laterally relative to each other about a generally vertical axis. A pair of length-adjustable links is connected between opposite sides of the tractor and the respective legs.

The overall arrangement is such that the caster wheels support a major share of the frame and cargo load and the hinge connection supports the remainder and transmits most of the propelling force by the tractor. The links permit adjustment of the space between the tanks and the tractor and transmit the remainder of the propelling force. The hinge connection facilitates quick attachment and detachment of the carrier from the tractor in addition to permitting limited selection of lateral spacing between the caster wheels.

15 Claims, 6 Drawing Figures

SEMI-MOUNTED CARRIER

BACKGROUND OF THE INVENTION

1. Field of the Invention:

The invention relates generally to wheeled cargo carriers adapted for coupling on a tractor and more particularly to such a carrier particularly adapted for carrying tanks containing liquids useful, for example, in agricultural spraying operations.

2. Prior Art

The field of agricultural spraying (for which the present invention was created) has included several systems for transporting the fluids to be used in the spraying operation. As discussed in U.S. Pat. No. 3,583,718 trailer-mounted tanks are satisfactory unless an earthworking implement, for example, is to be used behind the tractor. In such a case the tanks are mounted on the tractor itself, as shown in the patent, thus permitting the use of trail-behind implements as conditions may warrant.

Experience with tractor-mounted tanks has revealed some problems, particularly in conjunction with efforts to increase the spraying capacity of any given field-going unit. Large capacity tanks, filled with liquid, create heavy loads on the tractor which in some cases could approach or exceed structural strength limits of the tractor frame and/or tank-supporting structure secured thereon. In any case, the capacity of the system is limited by considerations of strength of the means for supporting the tanks.

A second adverse effect of heavy loads is the increased difficulty of steering and handling the tractor. With the tanks mounted as shown in the above-mentioned patent a significant portion of the weight of the tanks, fluid, and support structure is imposed upon the front wheels. In the typical agricultural-type tractor, the front wheels are the steerable wheels. Even if the wheels are steerable through a powered system, a significant increase in the weight on the wheels will make steering more difficult, particularly on soft ground. Steering effort would also be adversely affected if there were a significant difference in the quantity of fluid carried in each tank.

Efforts to design large capacity systems are also limited by considerations of the stability of the tractor. That is, the load must be sized and positioned to avoid creating moments which could tip the tractor, particularly on hillsides or under the effects of asymmetrical loading as above mentioned.

A further problem with tanks supported completely on the tractor is the time and effort required in attaching or detaching the tanks and the supporting structure.

A still further problem is the accessibility to and from the operator's station of the tractor when used with large sized tanks. Tractors are increasingly being equipped with fully enclosed cabs which include doors opening to the sides of the tractor. With large tanks mounted beside the tractor cab, the space is limited for opening the doors and for access to and from the cab.

SUMMARY

The invention provides a load carrier attachable to the forward end of a tractor and having a pair of wheel-supported load carrying portions disposed on opposite sides of the tractor. The load-carrying portions are adapted to support tanks for liquid, with the load being imposed principally onto the wheels and the remainder onto the connection at the forward end of the tractor.

Several advantages are provided. The attachment at the front of the tractor and disposition of the load-supporting portions at the sides of the tractor clears the area behind the tractor for the use of trailing implements. The wheels of the carrier support a majority of the total load to be transported and thus a tractor of a given size can support a greater load than if fully mounted as heretofore. For the same reason, the tractor is easier to steer and control since the weight imposed upon the front steerable wheels is reduced for any given total load transported. Further, stability of the unit is improved. The disposition of the load at the opposite sides of the tractor is conducive to providing an overall compact arrangement for easier handling and maneuverability. Moreover, the carrier of the invention is quickly and easily connectable to the tractor even when a load is supported on the carrier. Lastly, the invention in one embodiment enables the operator to hydraulically shift a tank away from the tractor to provide adequate space therebetween for operator access to and from the tractor.

Briefly, the objects of the invention are to provide an improved load carrier for a tractor wherein: the load-carrying capacity can be increased for a tractor of a given size and power rating; the load on the steerable front wheels is reduced resulting in easier handling; the stability of the unit is improved resulting in safer handling; the carrier can be connected to and detached from the tractor quickly and easily; and, the unit is compact in overall arrangement providing a manueverable machine.

DESCRIPTION OF THE PREFERRED EMBODIMENT

Figure 1:
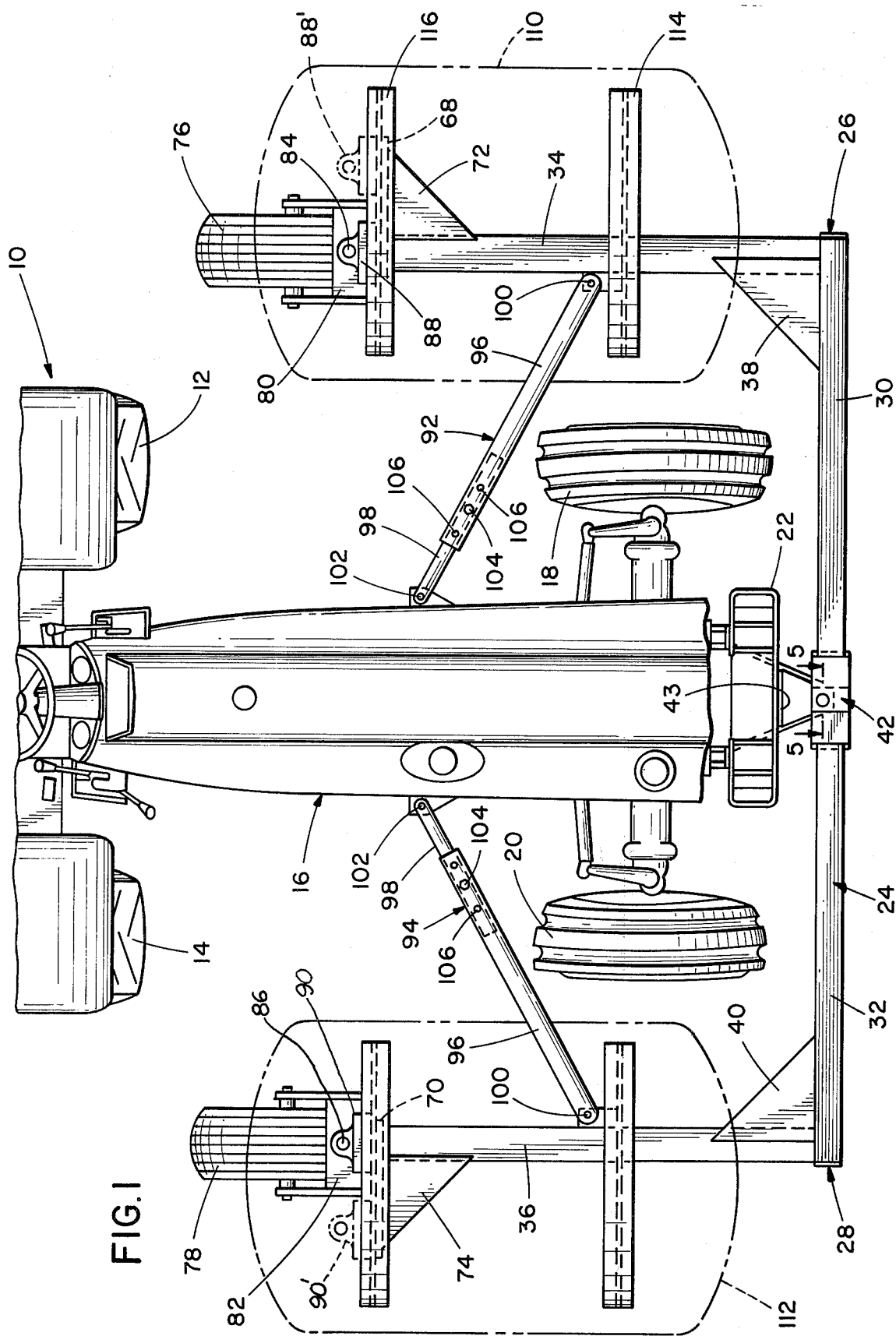
FIG. 1 is a plan view of a tractor with the carrier of the invention coupled thereto.

Referring first to the plan view of FIG. 1, there is shown a tractor 10 of the agricultural-type including drive wheels 12 and 14, a forwardly extending vehicle frame 16, and front steerable wheels 18 and 20. In accordance with customary practice a bracket 22 is secured to the front of the tractor adapted to support a plurality of weights (not shown).

In accordance with the invention, a carrier shown generally at 24 is adapted for coupling to the tractor 10 for supporting loads for transport. The carrier 24 includes a pair of L-shaped frame sections 26 and 28 disposed to define a U-shape in plan view (FIG. 1). The frame sections 26 and 28 comprise respective transverse tubular beams 30 and 32 and rearwardly extending legs 34 and 36 joined by welding. Respective gusset plates 38 and 40 reinforce the connections between the beams and legs of the respective frame sections 26 and 28.

The frame sections 26 and 28 are pivotally interconnected and mounted on the tractor 10 at a pivot connection 42. Since agricultural-type tractors typically include the above-mentioned weight-bracket 22, the pivot connection 42 is designed in conjunction with the bracket for practical reasons. The connection 42 is shown in detail in FIGS. 4 and 5 and includes a vertical back plate 43, a bottom plate 44, and a pair of forwardly converging side plates 46 and 48 welded to and extending forwardly from the bracket 22 to define a rigid box-like structure at the front of the tractor.

Figure 4:
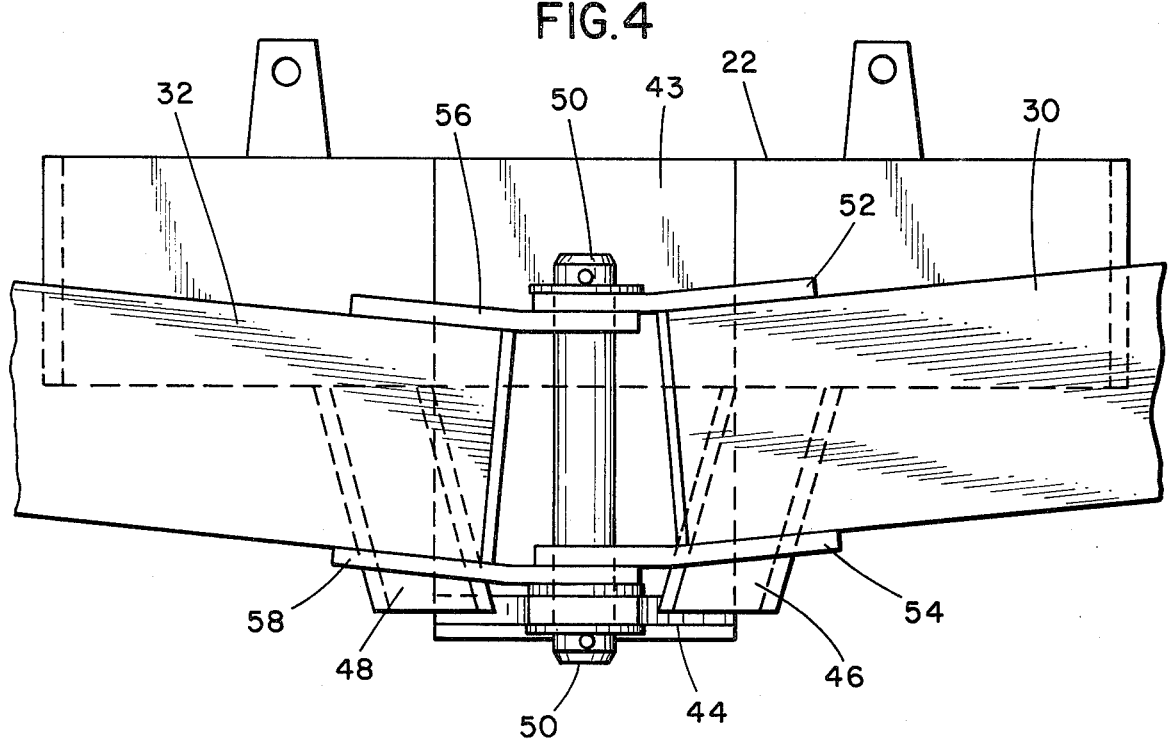
FIG. 4 is a fragmentary enlarged front elevation view of structure coupling the carrier to the front of the tractor.

A vertical pivot pin 50 serves as the basic element of the pivot connection 42. As shown in FIG. 4 the beams 30 and 32 are pivotally interconnected on the pin 50 by respective pairs of rigid straps 52, 54, and 56, 58 so as to be pivotable relative to each other about the axis of the pin. The pin 50 is supported on the plate 44 in a manner permitting limited oscillation of the pin.

Figure 5:
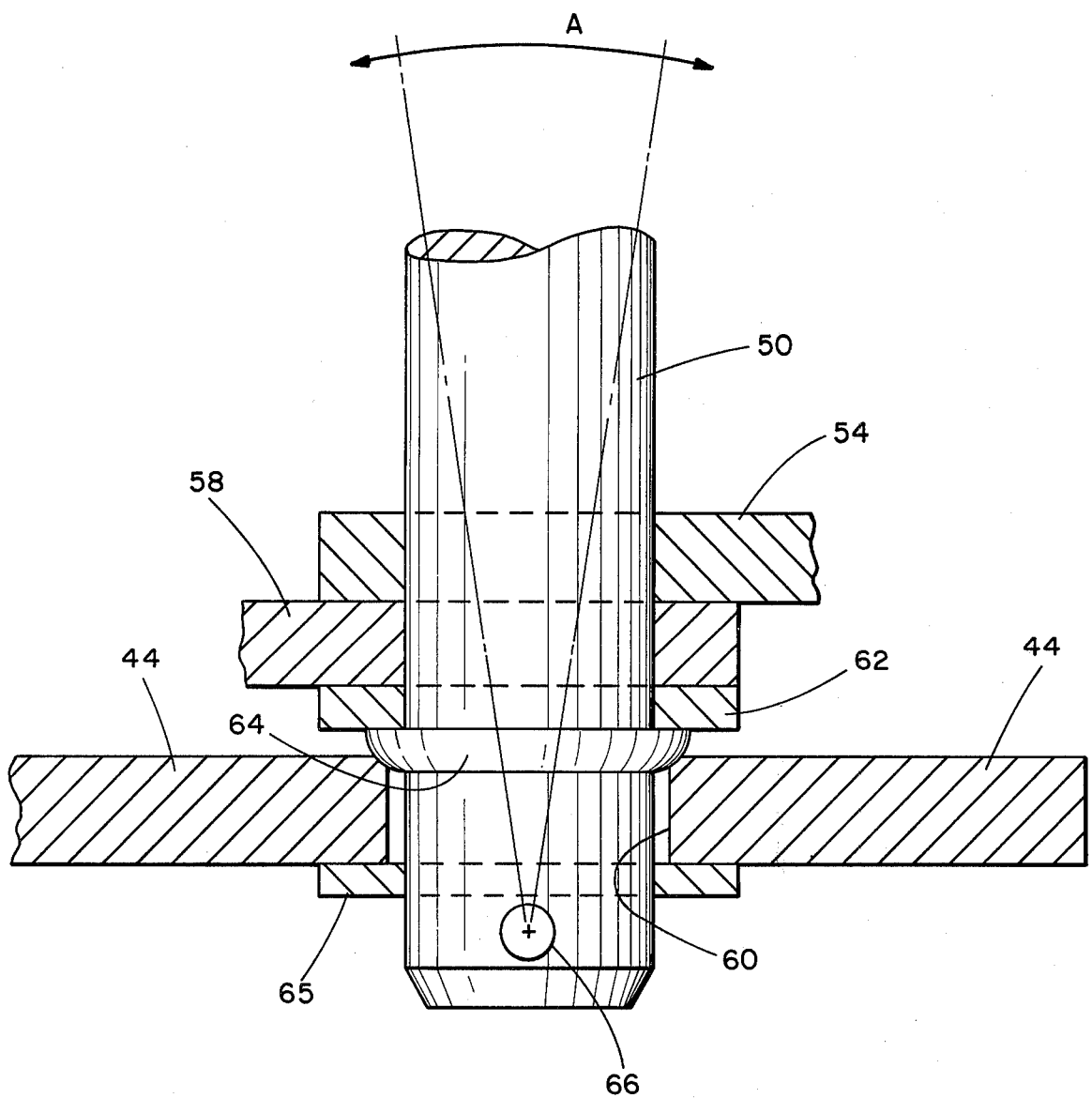
FIG. 5 is an enlarged sectional view of the connection structure taken along the lines 5—5 of FIG. 1.

As shown in detail in FIG. 5, a circular opening 60 is defined through the plate 44, so as to receive the pin 50 freely therethrough. A support ring 62 is secured onto the pin 50 by an annular weldment 64. The weldment 64 is seated on the plate 44 into the opening 60 and serves as a bearing for oscillating movement of the pin 50 relative to the plate 44. The pin 50 is prevented from shifting upwardly out of the opening 60 by a washer 65 held in place by a pin 66 received transversely through the pin 50.

The frame sections 26 and 28 include mounting plates 68 and 70 secured to the ends of the respective legs 34 and 36. Gusset plates 72 and 74 reinforce the connection between the legs and the mounting plates. Caster wheels 76 and 78 are connected to the frame sections 26 and 28 to provide ground support for a substantial portion of the load to be transported. The wheels 76 and 78 are journalled in respective yokes 80 and 82 having respective spindles 84 and 86. The spindles are journalled within bearing blocks 88 and 90 bolted to the mounting plates 68 and 70.

Figure 2:
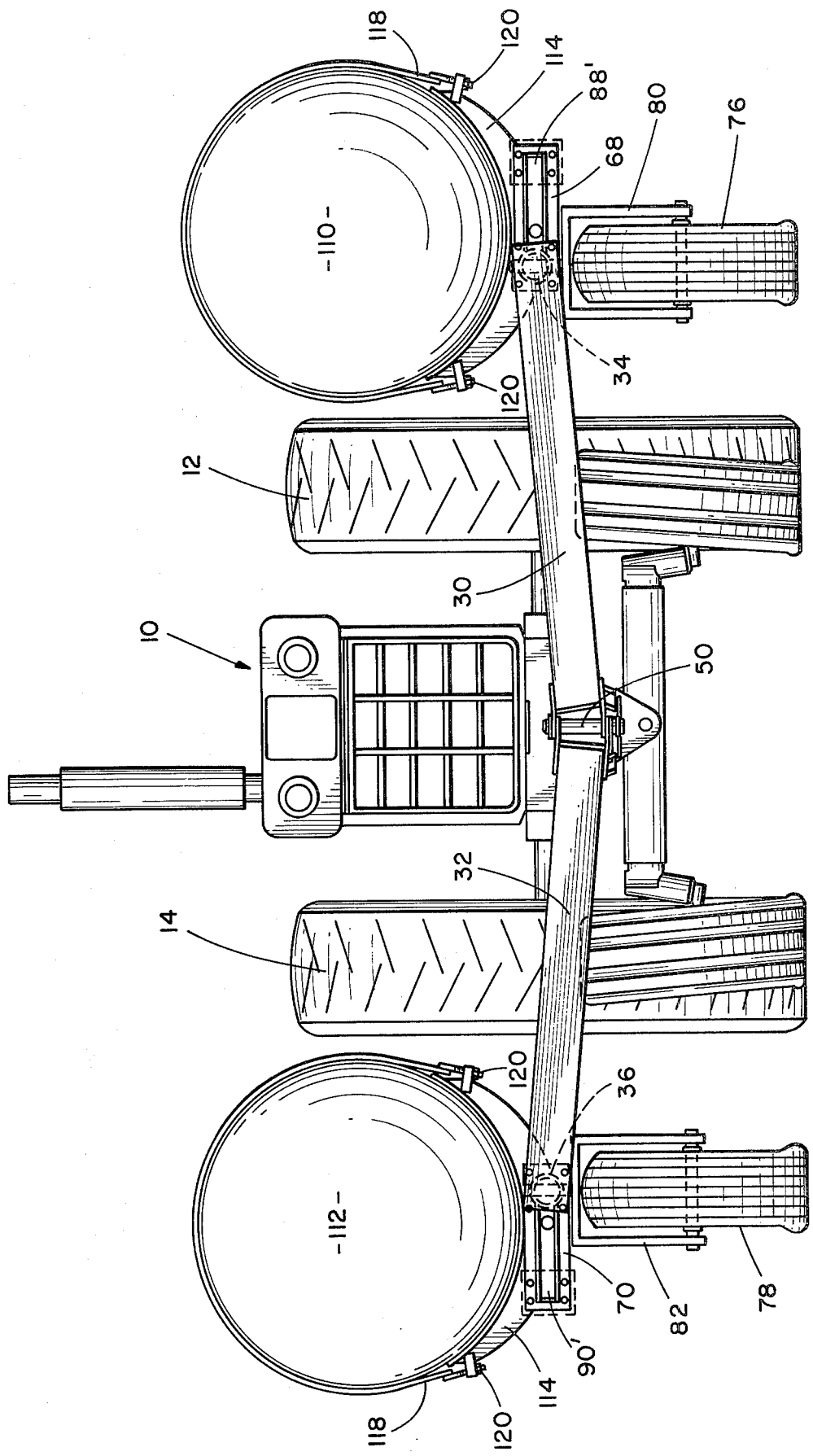
FIG. 2 is a front elevation view of the tractor and carrier combination of FIG. 1.

As best seen in FIG. 2, the mounting plates 68 and 70 are elongated laterally of the tractor and carrier enabling the respective caster wheels to be connected thereto in at least two laterally spaced positions. The outboard positions for bolting the respective bearing blocks 88 and 90 to the plates 68 and 70 are shown in dotted lines at 88' and 90' in FIGS. 1 and 2.

As shown in FIG. 1, links 92 and 94 are connected between the legs 34 and 36 respectively and the respective opposite sides of the frame portion 16 of the tractor. Each of the links 92 and 94 includes an elongated tube 96 and a rod 98 telescopically received within the tube. The tube 96 and rod 98 are connected to the frame legs 34 and 36 and the opposite sides of the frame portion 16 by removable pin connections 100 and 102 permitting limited vertical movement of the frame legs relative to the tractor. The length of each of the links 92 and 94 may be selectively varied, to thus vary the lateral spacing between the wheels 76 and 78 by a nut and bolt assembly 104 interconnecting the tube 96, and rod 98 at any of a plurality of spaced openings 106 through the rod 98.

Figure 6:
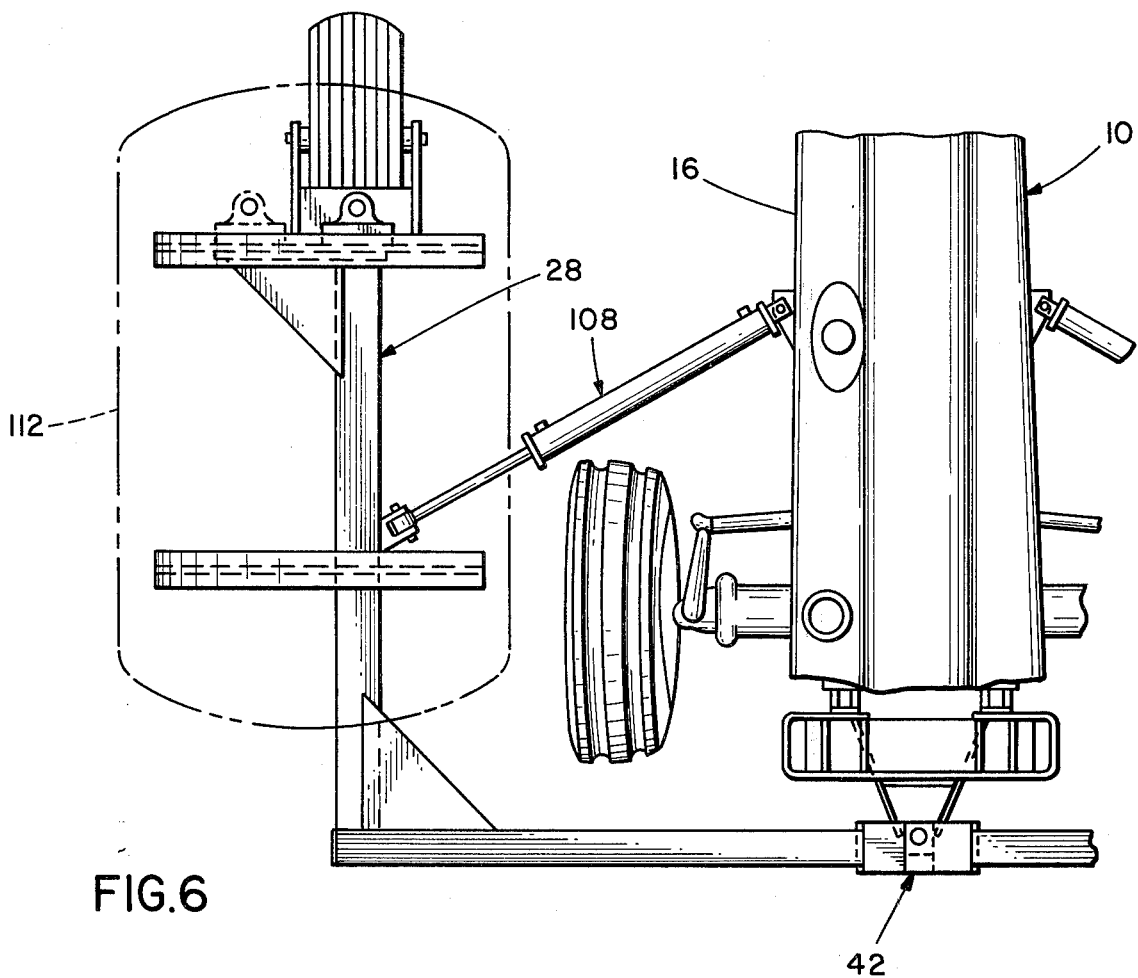
FIG. 6 is a fragmentary plan view of a second embodiment of the invention.

In a second embodiment of the invention shown in FIG. 6, a double-acting hydraulic piston-cylinder unit 108 may be used in place of the mechanical links 92 and 94. The unit 108 is powered from the hydraulic system of the tractor and is remotely controlled by the operator.

Figure 3:
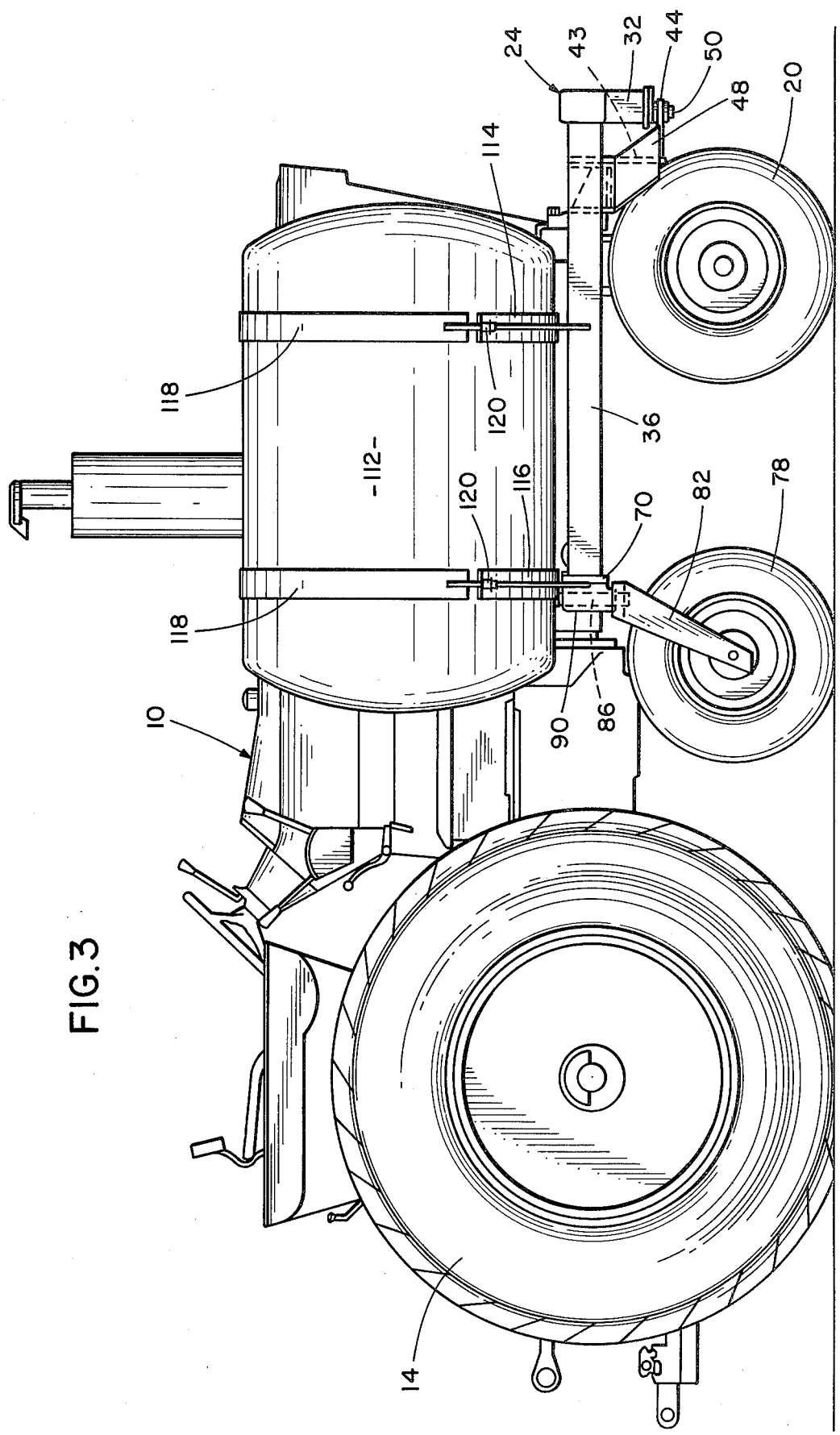
FIG. 3 is a side elevation view of the tractor and carrier combination.

In a preferred embodiment of the invention the load to be transported on the carrier 24 comprises tanks for liquids used in agricultural spraying operations. In practice the capacity of each of the tanks may be in the area of 350 gallons. Such tanks are shown at 110 and 112 in FIGS. 2 and 3 (in dotted lines in FIG. 1) supported on the frame legs 34 and 36 respectively. The tanks 110 and 112 are generally cylindrical in shape with the central longitudinal axes being generally parallel to the respective legs 34 and 36. Each of the tanks 110 and 112 is seated on a pair of semi circular cradle or saddle assemblies 114 and 116 welded on the respective frame legs 34 and 36 in parallel longitudinally-spaced relation. Straps 118 encircle the tanks and are fastened to the cradle assemblies by nut and bolt assemblies 120.

When used in agricultural spraying operations, the disclosed unit would of course include the necessary pumps, hoses, filters, spray booms, nozzles and the like for conveying the liquids out of the tanks and onto the ground. As mentioned above, the spacing between the wheels 76 and 78 can be selectively varied by adjusting the lengths of the links 92 and 94 or the hydraulic unit 108. This adjustment is permitted by the vertical pivot connection 42 between the frame sections 26 and 28. The connections 42, 100, and 102 permit limited oscillation of the pin 50 through an arc shown at A in FIG. 5 enabling the unit to accommodate uneven terrain. The caster wheels 76 and 78 may also be connected to the respective frame sections alternatively at laterally spaced positions shown at 88' and 90'.

In practice, the carrier 24 would include a jack stand (not shown) mounted on the front of either of the beams 30 or 32 close to the pivot connection 42. Disconnecting the carrier from the tractor involves the simple steps of lowering the jack stand into ground engagement; removing the pin 66 and washer 64 (FIG. 5) from the pin 50; raising the beams 30 and 32 and the pin 50 above the plate 44 by extending the jackstand; disconnecting the links 92 and 94 from the sides of the tractor and backing the tractor away. The ability to articulate the U-shaped frame about the connection 42 also provides flexibility in storing the carrier.

By the foregoing, Applicants have provided a mobile cargo carrier well suited to accomplish the objects of the invention.

What is claimed is:

1. A carrier adapted for supporting a load for transport by a tractor having a forwardly projecting vehicle frame portion, comprising:
   a horizontal centrally articulated U-shaped frame having a pair of load-supportable legs disposed in flanking relation to said vehicle frame portion;
   a pivot connection mounting said frame on the front of said vehicle frame portion for articulation of said legs relative to each other about a generally vertical axis;
   a pair of caster wheels secured respectively to said legs proximate to the rearmost extent thereof whereby the frame is supported forwardly on said tractor on said pivot connection and rearwardly on said caster wheels;
   and a pair of links connected respectively between said legs and the respective sides of said vehicle frame portion for maintaining said legs in spaced relation to the respective sides of said vehicle frame portion.

2. The subject matter of claim 1, including means for adjustably fixing the length of said links to selectively vary the lateral space between said caster wheels.

3. The subject matter of claim 1, including means for mounting said caster wheels on the respective frame legs selectively in a plurality of laterally spaced positions.

4. The subject matter of claim 1, wherein said links are connected between the respective legs and the vehicle frame sides by pivot connections permitting limited vertical movement of said legs relative to the tractor as caused by travel over uneven ground surfaces.

5. The subject matter of claim 1, including a cradle assembly secured on each of said legs and a tank for liquids mounted on each of said cradle assemblies.

6. the subject matter of claim 5, wherein said tanks are generally cylindrical with the longitudinal axes thereof parallel with the longitudinal extent of the respective supporting legs.

7. The subject matter of claim 1, including a generally cylindrical tank for liquids secured on each of said legs above the respective caster wheels such that a substantial portion of the load imposed by said tanks is supported by the caster wheels.

8. The subject matter of claim 7, including a pair of cradles on each of said legs in parallel longitudinally spaced relation, each of said cradles including a concave seat for receiving the tanks thereon in complementary engagement.

9. A carrier adapted for supporting a load for transport by a tractor having a forwardly projecting vehicle frame portion, comprising:
a generally horizontally disposed U-shaped frame having a pair of rearwardly extending load supportable legs disposed in flanking relation to said vehicle frame portion;
connection means mounting said frame on the front of said vehicle frame portion for limited oscillating movement of said frame enabling said legs to move vertically relative to said vehicle frame portion;
a pair of caster wheels secured one under each of said legs whereby the frame is supported forwardly on said tractor and rearwardly on said caster wheels;
and a pair of links connected respectively between said legs and the respective sides of said vehicle frame portion, whereby draft forces are transferred to said frame through said connection means and said links.

10. The subject matter of claim 9, wherein said frame includes a pivot joint at the front thereof enabling said legs to be movable toward and away from each other about a generally vertical axis.

11. The subject matter of claim 9, including a tank for liquids secured on each of said legs above the respective caster wheels such that a substantially portion of the load imposed by said tanks is supported by the caster wheels.

12. The subject matter of claim 11, wherein said tanks are generally cylindrical with the longitudinal axes thereof parallel with the respective rearwardly extending legs.

13. The subject matter of claim 12, including a pair of cradle assemblies on each of said legs having concave seat portions for receiving the tanks thereon in complementary engagement.

14. The subject matter of claim 9, including means releasably securing said connection means and said links to said vehicle frame portion, enabling the tractor to be driven into and out of coupling relation with the carrier.

15. The subject matter of claim 10, including means for adjustably fixing the length of said links to selectively vary the space between said legs about said pivot joint.

* * * * *